United States Patent [19]

Hays et al.

[11] Patent Number: 5,442,693
[45] Date of Patent: Aug. 15, 1995

[54] INTEGRATED OPERATOR CONSOLE

[75] Inventors: J. David Hays, Lexena, Kans.; G. Douglas Morlok, Belton, Mo.

[73] Assignee: AT&T Bell Laboratories, Murray Hill, N.J.

[21] Appl. No.: 171,809

[22] Filed: Dec. 22, 1993

[51] Int. Cl.⁶ .......................................... H04M 9/06
[52] U.S. Cl. .................... 379/308; 379/213; 379/84; 379/218; 379/201
[58] Field of Search .......... 379/308, 213, 84, 218, 379/214, 201

[56] References Cited

U.S. PATENT DOCUMENTS

| | | | |
|---|---|---|---|
| 4,589,107 | 5/1986 | Middleton et al. | 370/62 |
| 4,677,609 | 6/1987 | Piereth et al. | 370/60 |
| 4,686,698 | 8/1987 | Tompkins et al. | 379/53 |
| 4,847,829 | 7/1989 | Tompkins et al. | 370/62 |
| 4,918,322 | 4/1990 | Winter et al. | 379/214 |
| 4,939,771 | 7/1990 | Brown et al. | 379/218 |
| 5,014,267 | 5/1991 | Tompkins et al. | 370/62 |
| 5,014,303 | 5/1991 | Velius | 379/201 |
| 5,095,505 | 3/1992 | Finucane et al. | 379/201 |
| 5,101,425 | 3/1992 | Darland et al. | 379/112 |
| 5,163,087 | 11/1992 | Kaplan | 379/94 |
| 5,210,789 | 5/1993 | Jeffus et al. | 379/127 |
| 5,293,452 | 3/1994 | Picone et al. | 381/41 |
| 5,309,504 | 5/1994 | Morganstein | 379/218 |
| 5,309,505 | 5/1994 | Szlam et al. | 379/214 |

Primary Examiner—James L. Dwyer
Assistant Examiner—Michael N. Lau

[57] ABSTRACT

An integrated console for a human operator who provides listing and directory services, particularly for the 800 telephone number system, to callers via a stored program switching device employs simultaneous MS-DOS and a memory management utility, such as MicroSoft Windows™. Data is exchanged between applications for MS-DOS and applications for Windows™ via a shared memory. Data pertaining to the directory and listing services is stored in a database which is accessed via a data network which may be a LAN or a WAN. Thus, the information in the database can be accessed by a plurality of operators on consoles in the network. Communication between the operator console and the stored program switching device is achieved via a digital subscriber line which is coupled to the console via an interface board compatible with the integrated services data network (ISDN). The operator is provided the facility of delivering prerecorded audio messages to the caller via an audio system which may include provision for storage and delivery of messages in the operator's actual voice. Log-on and log-off procedures may be initiated simply by coupling or decoupling the operator's headset.

16 Claims, 5 Drawing Sheets

INTEGRATED OPERATOR CONSOLE

BACKGROUND OF THE INVENTION

1. Field of the Invention

This invention relates generally to arrangements and systems for facilitating an operator interface with a telephone switching system, and more particularly, to an operator console which facilitates communication between a human operator and a telephone caller via a stored program switching device (SPSD), particularly for providing directory assistance.

2. Description of the Related Art

Particularly in 800-number directory assistance service where a human operator must interface with a caller via a telephone switching system or network, there is a need for a system whereby the human operator has available to him or her a database of listings and directory services. One approach to facilitating the interaction between the human operator and the caller is to provide a console, but such consoles generally do not interface directly with the database. Moreover, such known consoles do not provide call processing or recorded messages. There is, therefore, a need for an integrated console arrangement which can access data in a remote database, present the data to a human operator, and permit the human operator to make the necessary listing information available to an inquiring caller via a stored program switching device (SPSD).

In addition to the foregoing, it is desired that the listing services choices available to the human operator be presented in the context of a custom formatted screen image. The human operator should then be able to transmit the database information directly to the caller.

It is, therefore, an object of this invention to provide a console which enables a human operator to provide directory assistance in a variety of operating environments, including 800-number directory assistance.

It is another object of this invention to provide an integrated console which is embodied in a commercially available personal computer of the type which employs a conventional disk operating system (DOS).

It is also an object of this invention to provide an integrated operator console system which will operate in a commercially available memory management system, such as the MicroSoft Windows TM environment.

It is a further object of this invention to provide an integrated operator console system which will interface with a telephone switching system or network.

It is additionally an object of this invention to provide an operator console arrangement wherein the operator logs on and off of the system by respectively coupling or decoupling a headset and/or by depressing a LOG key on a keyboard.

It is yet a further object of this invention to provide an operator console system which can access a plurality of databases via a data network.

It is also another object of this invention to provide an operator console system for use in information retrieval and call processing operations and which can access a database of listing services via a data network, such as a local area network (LAN) or a wide area network (WAN).

It is yet an additional object of this invention to provide an operator console which requires only minimal usage of the memory allocated in a host telephone switching system or network.

It is still another object of this invention to provide an operator console system which employs a conventional personal computer system which is arranged to permit an exchange of data between applications which operate in respective DOS and Windows TM environments.

It is a yet further object of this invention to provide an operator console system which facilitates the delivery to a telephone caller of information contained in a remote database, by a human operator.

SUMMARY OF THE INVENTION

The foregoing and other objects are achieved by this invention which provides, in a first apparatus aspect thereof, a console for a human operator which provides directory assistance to callers via a telephone system. The console is of the type which interfaces with a stored program switching device for facilitating communication between a telephone caller via the telephone system and the human operator. In accordance with the invention, the console is provided with a personal computer having a central processing unit, a random access memory, a communications bus for communicating with the central processing unit, a display for displaying information to the human operator, and a data input system for providing a communications interface between the human operator and said personal computer. An interface system is provided, having a first port for communicating with the communications bus and a second port for communicating with the stored program switching device. In addition, a network communication system has a first port for communicating with the communications bus and a second port for communicating with a network system.

In one embodiment of the invention, there is further provided an announcement system having a first port for communicating with the communications bus and a second port for communicating with an audio system coupled to the stored program switching device. The network communication system is arranged to be coupled to a database of services which the human operator can provide, and there is further provided an arrangement for displaying an indication of the services on the display of the personal computer. In a further embodiment, there is further provided a shared memory for facilitating the transfer of data between the database of services which the human operator can provide and the central processing unit of the personal computer.

In a further embodiment, there is provided a voice and signalling interface coupled to the interface system for controlling access to the stored program switching device via the personal computer, and a further system for accessing a database of services which the human operator can provide.

Some embodiments of the invention are provided with a headset coupler for engaging an operator headset to the operator console. Such a coupling or decoupling may function to initiate respective operator log-on and log-off procedures.

In accordance with a further embodiment of the invention, there is provided a console for a human operator which provides directory assistance to callers of a telephone system. The console is of the type which interfaces with a stored program switching device for facilitating communication between a telephone caller via the stored program switching device and the human operator. In this manner, the human operator provides directory assistance and listing services to the telephone caller.

In accordance with this further apparatus aspect of the invention, there is provided a central processing unit for processing data. A memory coupled to the central processing unit stores data relating to a plurality of process functions. The memory has a first memory region for storing operating data for controlling an operating system of the central processing unit. A second memory region stores call processing data for controlling the operation of a call processing system. A third memory region is employed to store network data for controlling the operation of a data communications network. Finally, a fourth memory region is employed to store interface data for controlling the interface system. Further in accordance with the invention, there is provided a display for displaying information to the human operator, and an operator data input system for providing a communications interface between the human operator and the central processing unit. An interface system has a first port for communicating with the central processing unit and a second port for communicating with the stored program switching device in response to the interface data stored in the fourth memory region. There is additionally provided a network communication system having a first port for communicating with the central processing unit and a second port for communicating with the data communications network, responsive to the network data in the third memory region.

In one embodiment of this second apparatus aspect of the invention, the console is further provided with an audio system for storing a plurality of audio messages. Also, a fifth memory region in the memory is employed to store audio message data which controls the operation of the audio system. In a sixth memory region in the memory, a memory management utility is stored. In some embodiments, the memory management utility is of the type which is commercially available under the trade name Windows TM, version 3.1 or higher, marketed by MicroSoft, Inc.

In accordance with a method aspect of the invention, a method is provided for processing a telephone call in an operator console to provide to a caller of a directory assistance service. The method includes the steps of:
activating the operator console by initiating an operator log-on procedure;
sending a signal to a stored program switching device which indicates that the console is active;
coupling the console to a caller who is engaged in a telephone call via a digital caller line which couples the console to the stored program switching device;
communicating with a database of listing services; and
conducting information from the database of listing services selectably to the caller and the display of the operator console via a shared memory.

In one embodiment, the step of activating the operator console includes the steps of booting up a central processing unit under a disk operating system and loading a memory management utility, which as stated, may be of the type marketed under the trade name Windows TM by MicroSoft, Inc. Additionally, the disk operating system is marketed under the trade mark MS-DOS ®, version 5.1 or higher, by MicroSoft, Inc.

In accordance with a specific illustrative embodiment of this method aspect of the invention, the step of communicating with a database comprises the further step of engaging a data network, which in certain embodiments, may be a local area network (LAN) or a wide area network (WAN). Such a data network constitutes a separate data path from the path used to communicate with a telephone caller. A digital subscriber line is coupled to the operator console and forms the link by which the telephone caller is engaged in a telephone conversation with the human operator. The digital subscriber line is coupled to a stored program switching device.

The step of conducting information from the database of listing services selectably to the caller and the display of the operator console via the shared memory comprises the further step of sharing information between computer applications prepared for the disk operating system and computer applications prepared for the graphical user interface via the shared memory In some embodiments of the invention, the step of initiating a human operator log-on procedure incorporates the step of installing an operator headset. In such a system, the inserting of the headset plug into the headset socket of the unit initiates the log-on process. In other embodiments, the removal of the headset plug initiates the log-off procedure.

BRIEF DESCRIPTION OF THE DRAWING

Comprehension of the invention is facilitated by reading the following detailed description, in conjunction with the annexed drawing, in which.

DETAILED DESCRIPTION

From the standpoint of hardware, the specific illustrative embodiment of the integrated operator console of the present invention is provided with an ISA-bus personal computer, a standard 101 PC keyboard with customized key caps, as will be described hereinbelow, a VGA monitor, a fixed drive (preferably 80 Mb or larger), a floppy diskette drive (preferably 1.44 Mb capacity), a network access unit (NAU) card, a custom personal announcement card (PAC), an ISA-bus-compatible intelligent personal computer interface card (IPIB), and operator headset cables.

The software of the integrated operator console consists, in this embodiment, of an operating system (MS-DOS), a shared memory management resource utility (MicroSoft Windows TM), local area network software (TCP/IF or equivalent), audio control software (for personal announcement card (PAC)), position software for data retrieval, operations statistics collection software, call processing software, and diagnostic and maintenance software.

Figure 1:
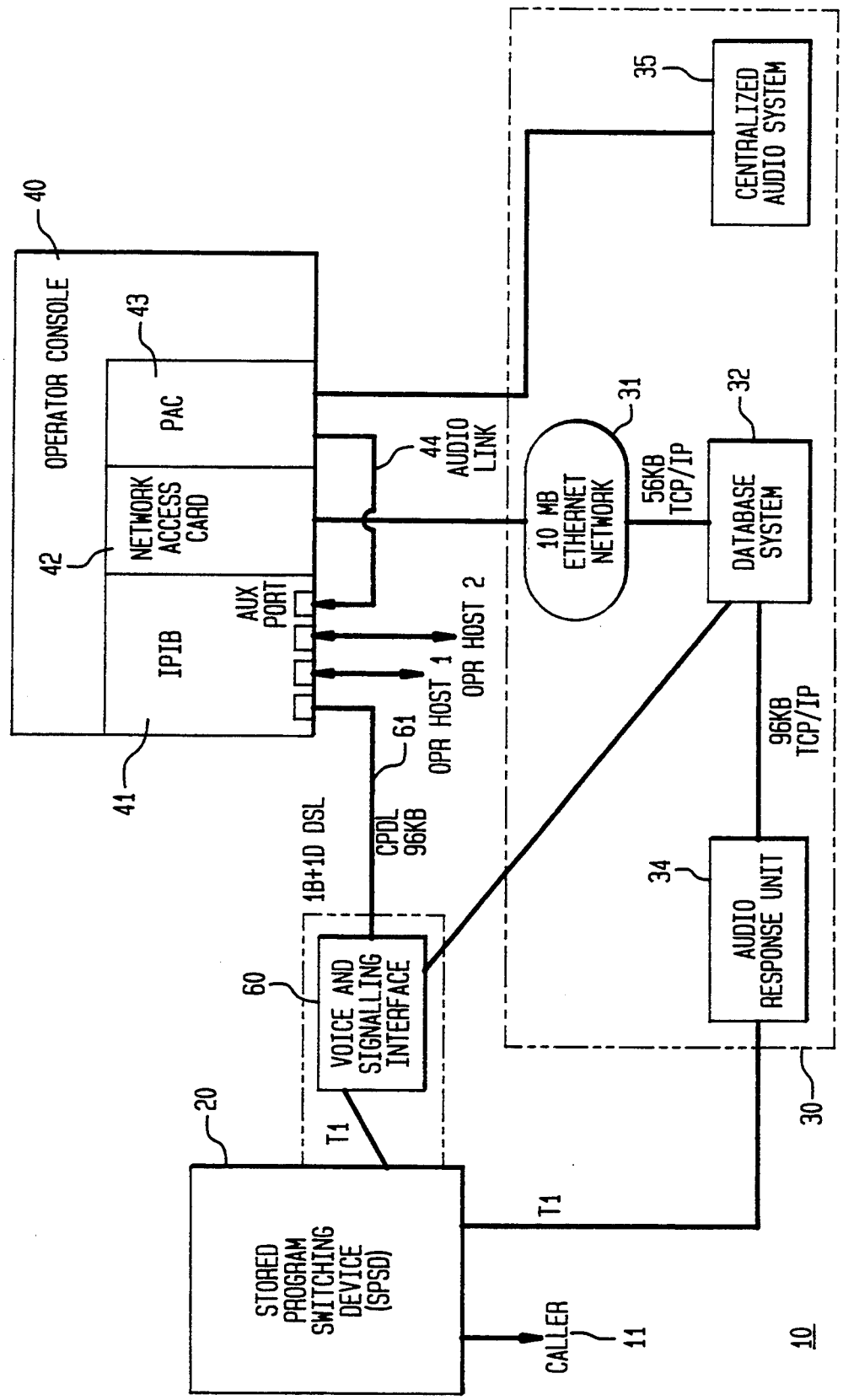
FIG. 1 is a function block representation of a specific illustrative embodiment of a directory assistance network configuration constructed in accordance with the principles of the invention.

FIG. 1 is a function block representation of a specific illustrative embodiment of a directory assistance network configuration constructed in accordance with the principles of the invention. As shown in this figure, a directory assistance arrangement 10 is provided with a stored program switching device (SPSD) 20, a listing services data base access system 30, and an integrated operator console 40. Stored program switching device 20 may be of a type commonly found in the telephone system, such as the 5ESS electronic switching system. The stored program switching device is shown to be coupled to a caller 11.

Stored program switching device 20 is coupled to integrated operator console 40 via an operator position controller 60, which is itself connected to integrated operator console 40 via a subscriber line 61. In this embodiment of the invention, subscriber line 61 is a digital subscriber line which carries digital audio information to the integrated operator console. As shown the subscriber line is coupled to a digital interface board 41 in the integrated operator console, the digital interface board being of a type which is adapted to the standards of the integrated services digital network (ISDN) system (not shown). The digital interface board is of a type which is characterized as an intelligent personal computer interface board (IPIB).

The integrated operator console additionally contains in the specific illustrative embodiment of the invention a personal announcement board 43 which contains recorded audio messages which can be delivered to the caller, under control of the human operator, via an audio link 44 which is connected to an auxiliary input port of the digital interface board. In some embodiments, the recorded audio messages may include in its recorded message library (not shown) a message recorded in the human operator's own voice. In addition, the personal announcement board is connected, in this embodiment, to a centralized audio system 35 which can supply audio message to the personal announcement board.

Integrated operator console 40 is coupled to listing services data base access system 30 via a data network 31, which as previously noted, may be a local area network (LAN) in some embodiments of the invention. Integrated operator console is provided with a network access card 42 which provides the interface for the data network, which is itself connected to receive the listings data from data base 32. The data network may be of the commercially available TCP/IP Ethernet type, and in some embodiments of the invention, may have a 56 Kb capacity.

In some embodiments of the invention, database information is provided directly to the caller in the form of automated announcements. This is achieved by operation of an audio response unit 34 which is connected to data base 32 illustratively via a 96 Kb TCP/IP connection. Audio response unit 34 is coupled to caller 11 via a T1 trunk which is terminated at stored program switching device 20.

Figure 2:
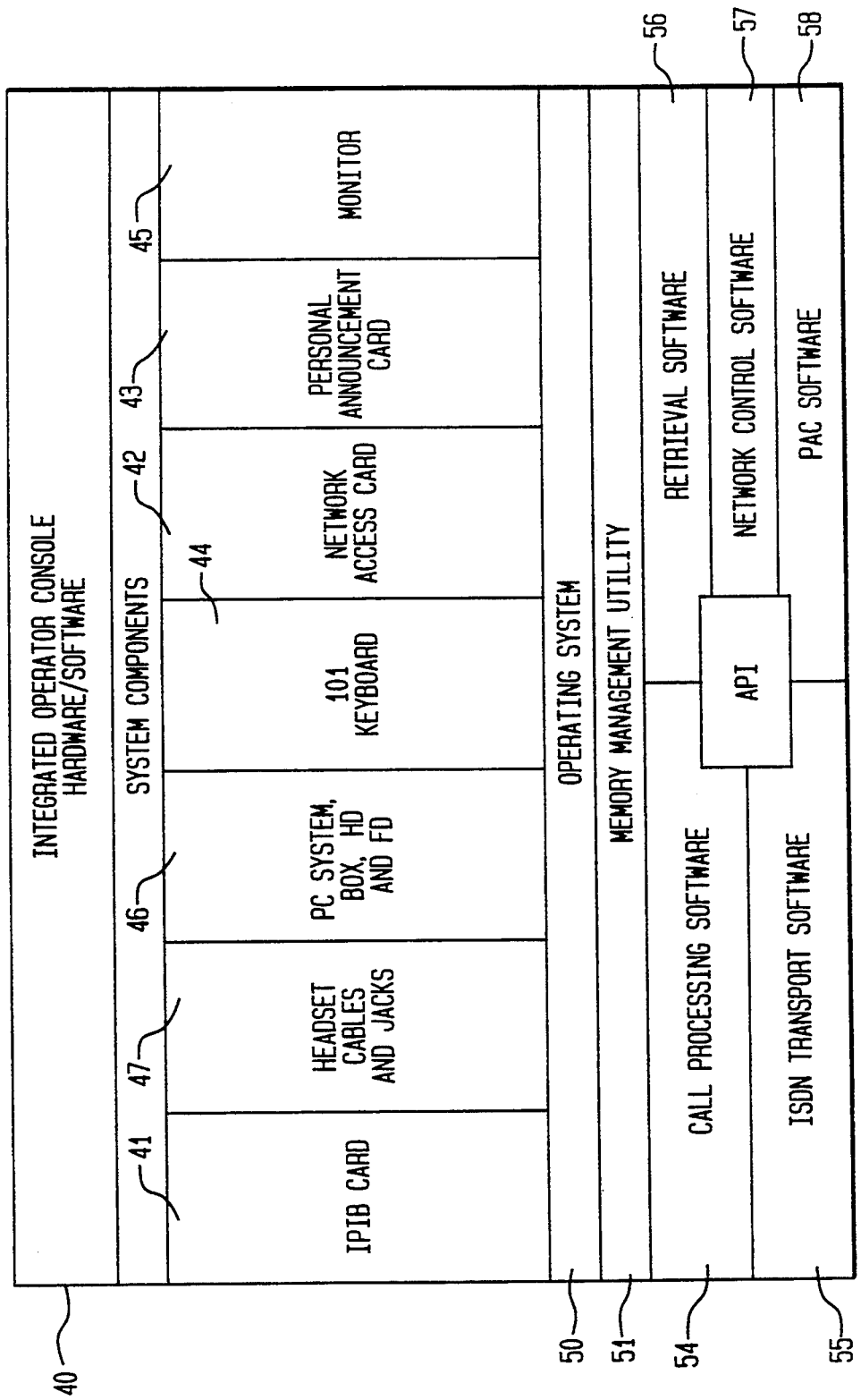
FIG. 2 is a function block representation of a specific illustrative embodiment of a hardware/software configuration for an integrated operator console constructed in accordance with the principles of the invention.

FIG. 2 is a function block representation of a specific illustrative embodiment of a hardware/software configuration for an integrated operator console constructed in accordance with the principles of the invention. Elements of structure which bear analogous correspondence to elements discussed hereinabove are similarly designated. As shown in this figure, integrated operator console 40 contains digital interface board 41, network access card 42, and personal announcement card (PAC) 43, as previously described. Additionally, there is provided a personal computer system 46, a plurality of headset cables and jacks 47, and a keyboard 46. A display monitor 45 shown as a component and is external to, but can be coupled to, integrated operator console 40.

FIG. 2 further shows function blocks representing installed software in integrated operator console 40. The illustrative software packages represented in the integrated operator console include an operating system 50, which, in some embodiments, may be the commercially available MS-DOS disk operating system, version 5.0 or higher, and a memory management utility, which may be the commercially available Windows ™ system, version 3.1 or higher. Both such systems are marketed by MicroSoft, Inc. The integrated operator console shown in FIG. 2 is further provided with call processing software 54; specialized integrated operator console software; ISDN transport software 55; retrieval software 56; network control software 57; and audio control (PAC) software 58.

Figure 3:
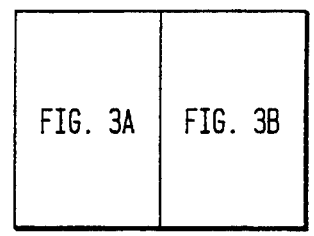
FIGS. 3, 3A and 3B together constitute a plan view of an illustrative arrangement of the keys on a keyboard for use with the integrated operator console of the present invention.
Figure 3B:
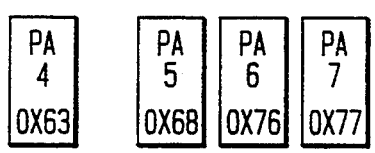
Figure 3A:
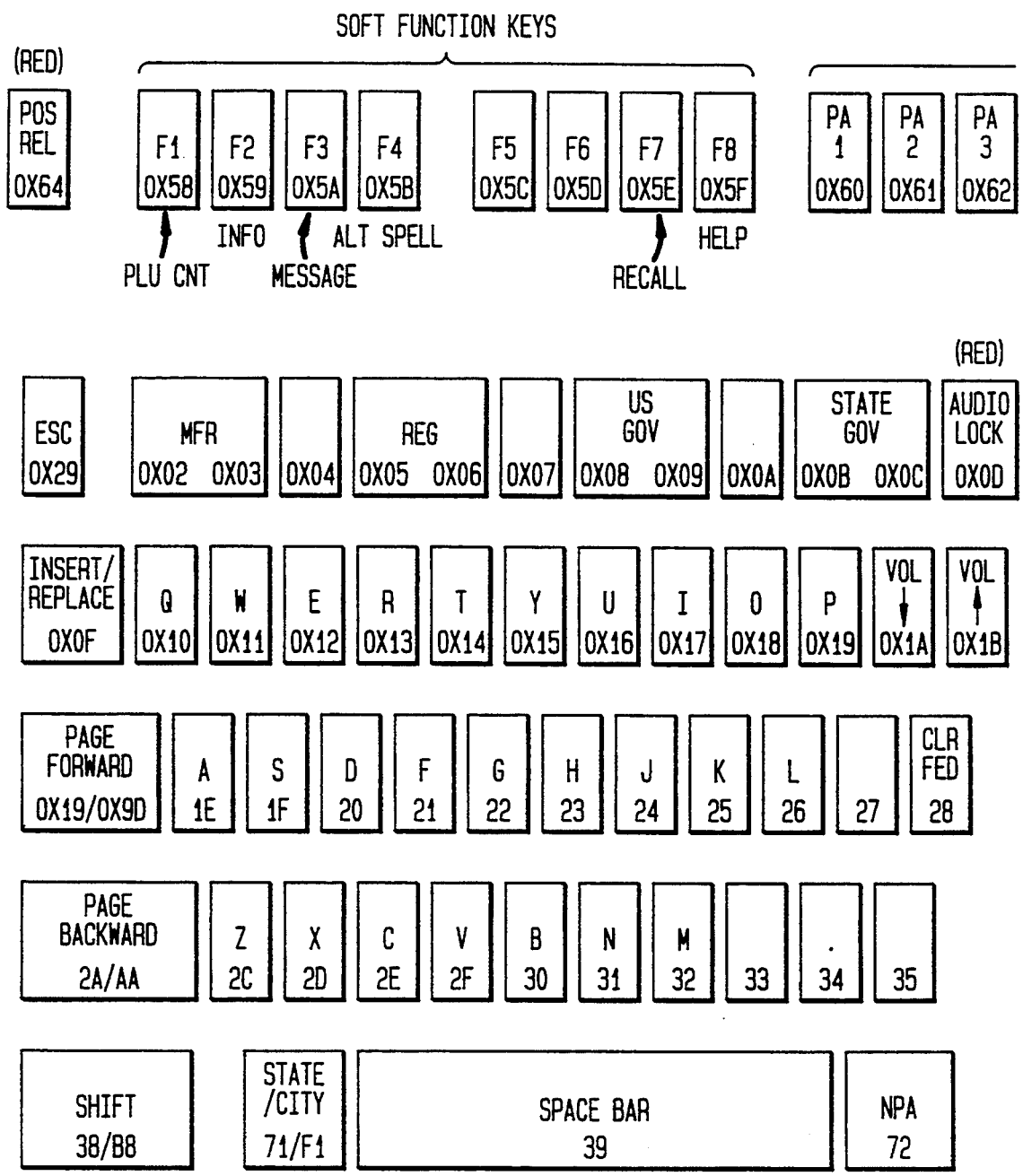

FIGS. 3A and 3B together constitute a plan view of an illustrative arrangement of the keys on a keyboard for use with the integrated operator console of the present invention. As shown in these figures, the keyboard is a conventional 101-key keyboard with customized key caps.

Figure 4:
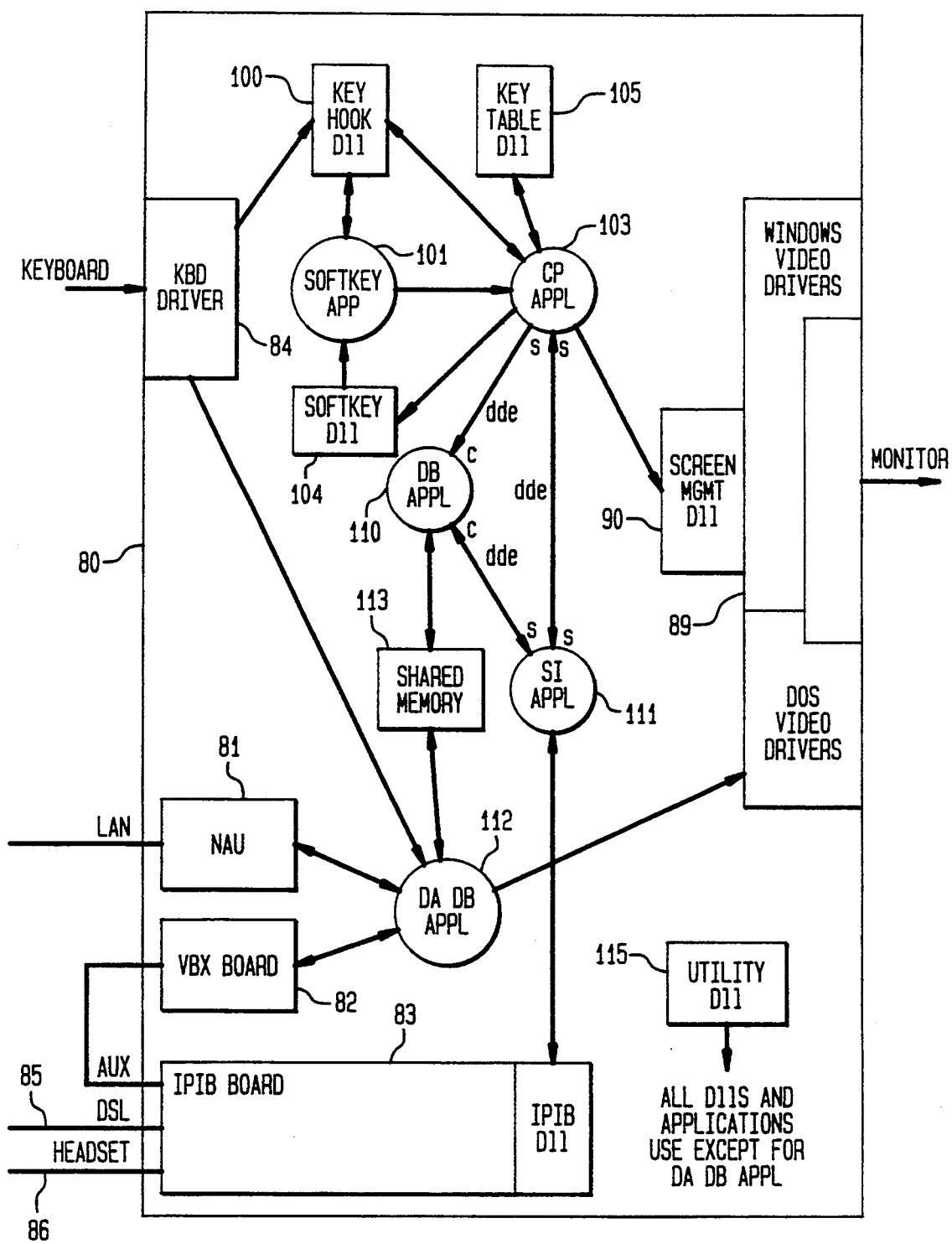
FIG. 4 is a process organization diagram which is useful in describing an illustrative call processing embodiment of the invention.

FIG. 4 is a process organization diagram which is useful in describing an illustrative call processing embodiment of the invention. As shown in this figure, integrated operator console 80 has incorporated therein a network access unit 81 which is connected to a data network (not shown); a voice board 82; a digital interface board 83 which has associated driver software associated therewith, and which is connected at respective outputs thereof to voice board 82, digital subscriber line 85 which is coupled to a stored program switching system (not shown), and operator headset 86 (not shown); and a keyboard driver 84 which receives operator input data via a keyboard (not shown). There are additionally provided DOS/Windows video drivers which are coupled to a display monitor (not shown). The DOS/Windows video drivers are controlled by a screen management utility 90.

Keyboard driver 84 delivers the operator's input data to key hook utility 100 which shares its status information with a softkey application 101. The softkey application delivers its data to central processor 103 which communicates back to the softkey application via a softkey utility 104. Information relating to the keyboard key caps is provided to central processor 103 from a key table utility 105. Together, these units provide the information necessary for the central processor to obtain the operator's input information.

As can be seen from the diagram of FIG. 4, central processor 103 controls screen management utility 90, and exchanges information with data base application 110 and switch interface application 111. The switch interface application is shown to communicate with the driver software associated with digital interface board 83. The data base application and a directory access data base application 112 exchange information via a shared memory 113. As noted above, network access unit 81 accesses the remote listing services data base (not shown in this figure) via a network (not shown in this figure). Additionally, directory access data base application 112 provides information to voice board 82, illustratively for selecting appropriate recorded messages which are sent to the caller (not shown) via the AUX input of digital interface board 83 and digital subscriber line 85.

The exchange of information between central processor 103, data base application 110, and switch interface application 111 is achieved in this specific illustrative embodiment of the invention in the Windows TM environment, illustratively employing dynamic data exchange (DDE). Thus, in this embodiment, shared memory 113 assists in the exchange of data between applications, including between DOS and Windows TM applications. Finally, integrated operator console 80 is provided with certain utility applications 115 which are utilized by all other utilities and applications, except directory assistance data base application 112 in this embodiment.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A console for facilitating the providing of directory assistance by a human operator to a caller of a telephone system, the console being of the type which interfaces with a stored program switching device (SPSD) for facilitating communication between the caller via the stored program switching device and the human operator, the console comprising:
   personal computer means having:
   a central processing unit,
   a first random access memory location having a database application installed therein,
   a second random access memory location having a directory assistance database application installed therein,
   a third random access memory location wherein directory assistance data is shared between said database application and said directory assistance database application,
   a communications bus for communicating with the central processing unit,
   a display for displaying information to the human operator, and
   a data input system for providing a communications interface between the human operator and said personal computer means;
   interface means having a first port for communicating with said communications bus and a second port for communicating with the stored program switching device;
   network communication means having a first port for communicating with said communications bus and a second port for communicating with a remote directory assistance data system; and
   audio communications means having a first port via which it is accessed by said directory assistance database application in said third random access memory location, and a second port via which audio messages are conducted to said interface means.

2. The console of claim 1, wherein said network communication means is arranged to be coupled to a database of services which the human operator can provide.

3. The console of claim 2, wherein there is further provided means for displaying an indication of said services on said display of said personal computer means.

4. The console of claim 1, wherein said audio communications means comprises a voice and signalling interface coupled to said interface means for controlling access to the stored program switching device by said personal computer means.

5. The console of claim 1, wherein there is further provided headset coupling means for engaging an operator headset to the console.

6. The console of claim 5, wherein there is further provided means responsive to said headset coupling means for initiating respective operator log-on and log-off procedures.

7. A console for a human operator who provides directory assistance to callers of a telephone system, the console being of the type which interfaces with a stored program switching device for facilitating communication between a telephone caller via the telephone system and the human operator, whereby the human operator provides directory assistance and listing services to the telephone caller, the console comprising:
   a central processing unit for processing data;
   a memory coupled to said central processing unit for storing data relating to a plurality of process functions, said memory having:
   a first memory region for storing operating data for controlling an operating system of said central processing unit,
   a second memory region for storing call processing data for controlling the operation of a call processing system,
   a third memory region for storing network data for controlling the operation of a data communications network,
   a fourth memory region for storing interface data for controlling a telephone switching system interface system;
   a fifth memory region location having a database application installed therein,
   a sixth memory region having a directory assistance database application installed therein; and
   a seventh memory region wherein directory assistance data is shared between said database application and said directory assistance database application,
   a display coupled to said central processing unit for displaying information to the human operator;
   an operator data input system for providing a communications interface between the human operator and said central processing unit;
   interface means having a first port for communicating with said central processing unit and a second port for communicating with the stored program switching device in response to said interface data stored in said fourth memory region;
   network communication means having a first port for communicating with said central processing unit and a second port for communicating with said data communications network in response to said network data in said third memory region; and
   communications means having a first port via which it is accessed by said directory assistance database application in said third random access memory location, and a second port via which messages are conducted to said interface means.

8. The console of claim 7, wherein said communications means further comprises an audio system for storing a plurality of audio messages, and there is further provided an eighth memory region in said memory for storing audio message data for controlling the operation of said audio system.

9. The console of claim 7, wherein said console further comprises a ninth memory region in said memory for storing graphical user interface data for controlling a graphical user interface employing iconic images on said display.

10. A method of processing a telephone call in an operator console to provide to a caller a directory assistance service, the method comprising the steps of:
activating the operator console by initiating an operator log-on procedure;
sending a signal to a stored program switching device which indicates that the console is active;
coupling the console to a caller who is engaged in a telephone call via a digital subscriber line which couples the console to the stored program switching device;
accessing a database application stored in a first memory location of a memory in said operator console;
accessing via said database application a further database application which is specifically adapted to retrieve listing services information and which is stored in a second memory location of a memory in said operator console;
communicating via a network system, and in response to said further database application, with a remote database of listing services information;
conducting information retrieved from said remote database of listing services information to a third memory location which is shared by said database application and said further database application;
conducting information retrieved from said remote database of listing services information to the caller and the display of the operator console via said shared memory in said third memory location.

11. The method of claim 10, wherein step of communicating with a remote database of listing services information comprises the further step of engaging a local area network data access system in response to said further database application.

12. The method of claim 10, wherein prior to said step of activating the operator console there are provided the steps of:
booting up a central processing unit under a disk operating system;
loading a memory management utility; and
sharing information between computer applications prepared for said disk operating system and computer applications prepared for said memory management utility via said shared memory.

13. The method of claim 12, wherein said memory management utility is marketed under the trade name Windows TM by MicroSoft, Inc.

14. The method of claim 13, wherein said disk operating system is marketed under the trade mark MS-DOS ® by MicroSoft, Inc.

15. The method of claim 10, wherein said step of initiating an operator log-on procedure comprises the step of installing an operator headset.

16. The method of claim 10, wherein said step of coupling the console to a caller who is engaged in a telephone call via a digital subscriber line comprises the step of controlling a voice and signalling interface interface unit.

* * * * *